United States Patent [19]
Bauck et al.

[11] Patent Number: 5,202,821
[45] Date of Patent: Apr. 13, 1993

[54] SAMPLED-DATA CONTROL SYSTEM EXHIBITING REDUCED PHASE LOSS

[75] Inventors: Randall C. Bauck, Boulder; Scott E. Chase, Longmont; James W. Hargarten, Lafayette, all of Colo.

[73] Assignee: Maxtor Corporation, San Jose, Calif.

[21] Appl. No.: 722,866

[22] Filed: Jun. 28, 1991

[51] Int. Cl.⁵ ............................................. G05B 13/02
[52] U.S. Cl. ..................................... 364/162; 364/178
[58] Field of Search ................. 364/162, 163, 178, 179

[56] References Cited

U.S. PATENT DOCUMENTS

| | | | |
|---|---|---|---|
| 4,451,878 | 5/1984 | Shigemasa | 364/162 |
| 4,466,054 | 8/1984 | Shigemasa et al. | 364/162 |
| 4,488,242 | 12/1984 | Tabata et al. | |
| 4,539,633 | 9/1985 | Shigemasa et al. | 364/162 |
| 4,607,326 | 8/1986 | Mori et al. | 364/162 |
| 4,641,235 | 2/1987 | Shigemasa et al. | 364/162 |
| 4,679,136 | 7/1987 | Shigemasa | |
| 4,861,960 | 8/1989 | Haefner et al. | |

Primary Examiner—Joseph Ruggiero
Assistant Examiner—Jim Trammell
Attorney, Agent, or Firm—Blakely, Sokoloff, Taylor & Zafman

[57] ABSTRACT

An automatic digital control system includes a proportional integral derivative (PID) compensator in which the digital differentiator portion, with its associated zero-order hold, is implemented according to an algorithm that reduces phase loss as a function of frequency. The digital differentiator is based only on a present error sample so that the output of the digital differentiator (with its ZOH) is made to resemble an amplitude-balanced step function (i.e., a doublet) during a given sample period T. The step transition occurs at one-half of the period (i.e., at T/2). Another embodiment further reduces phase loss by confining the output waveform of the differentiator to some fraction of the total sampling period. During the remaining portion of the sampling period the digital differentiator (again, with its associated ZOH) is forced to some desired reference level.

20 Claims, 11 Drawing Sheets

FIG_1 (PRIOR ART)

FIG_2 (PRIOR ART)

FIG_3A (PRIOR ART)

FIG_3B (PRIOR ART)

FIG_4A

FIG_4B

FIG_4C

FIG_6A

FIG_6B

FIG_7A

FIG_7B

FIG_8A

FIG_8B

FIG_9

FIG_10A

FIG_10B

FIG_11

FIG_12A

FIG_12B

FIG_13

FIG_14A

FIG_14B

SAMPLED-DATA CONTROL SYSTEM EXHIBITING REDUCED PHASE LOSS

RELATED APPLICATIONS

The present application is related to co-pending U.S. Patent application entitled "Control System Employing Early-Off Hold Function", Ser. No. 07/722,663; filed Jun. 28, 1991, which application is assigned to the assignee of the present invention.

FIELD OF THE INVENTION

This invention relates to the field of feedback control systems; particularly, sampled-data control systems which employ a digital differentiator as part of the control strategy.

BACKGROUND OF THE INVENTION

In recent years control systems have assumed an increasingly central role in the advancement of modern technological society. Virtually every aspect of our daily lives is influenced by some type of control system. Control systems are also ubiquitous throughout all sectors of industry. Fields such as quality control of manufacture products, space and military weapons technology, robotics, computer control, automatic assembly lines, transportation systems, automobile engine control, and many others, all employ a theory of automatic controls. As an example, a control system for controlling a robot arm is disclosed in U.S. Pat. No. 4,488,242. Needless to say, this list is growing at an ever increasing rate.

In general, the objective of any closed-loop control system is to regulate the outputs of a "plant" in a prescribed manner by the inputs through the elements of the control system. The "plant" of a control system is defined within the context of this application as that part of the system to be controlled. The inputs to the plant are called the "actuating signals", and the outputs are known as the "controlled variables".

To obtain satisfactory response characteristics in a control system, an additional component—frequently referred to as a "compensator" or a "controller"—is connected within the control loop. While a variety of compensator designs exist, one widely adopted approach utilizes proportional, integral, and derivative compensator elements to develop the actuating signal. Examples of control systems that employ proportional-integral-derivative (PID) compensators are found in U.S. Pat. Nos. 4,679,136 and 4,861,960.

Control systems can be classified in two ways: Continuous-data systems and sampled-data systems. A continuous-data system is one in which the signals at various parts of the system are all continuous functions of time. Sampled-data control systems differ from continuous-data systems in that a signal (or signals) is measured or known only at specific, discrete instants of time.

In an analog sampled-data control system a sample and hold circuit is typically used to sample a system parameter at discrete points in time. The circuit then holds this value for one sample period. Thus, the output of the sample and hold represents or approximates the continuous time varying value of the sampled system parameter. If a digital computer is used in the control of a sampled-data control system (as is commonly the case), then such systems are called digital sampled-data control systems. In a typical digital sampled-data control system, an analog-to-digital (A/D) converter is used to sample a continuous signal. The digital computer then calculates a control value which is subsequently converted to an actuating signal by a digital-to-analog (D/A) converter. For such a system the D/A converter performs the hold function.

Because digital computers provide many advantages in terms of size, flexibility and cost, computer control has become increasingly popular in recent years. The problem with digital control systems, however, is that they tend to have less desirable frequency response characteristics when compared to their analog counterparts. In particular, digital compensators suffer from an exceedingly large phase loss as a function of operating frequency. The extreme phase loss associated with digital control systems compels the circuit designer to either lower the control loop bandwidth or compromise system stability. Hence, the overall system performance is undermined.

As a consequence, there remains an unsatisfied need to reduce the phase loss associated with digital control systems.

SUMMARY OF THE INVENTION

An automatic control system exhibiting reduced phase loss is described in conjunction with a sampled-data control system. The invention involves implementing the digital differentiator portion of a digital compensator in a way that reduces phase loss over frequency, as compared to prior art methods. The reduction in phase loss permits a greater operating bandwidth, thereby enhancing performance without a corresponding increase in sample rate, cost or complexity.

In accordance with one embodiment of the present invention, a digital differentiator with an associated zero-order hold (ZOH) is based only on a present error sample. The output of the digital differentiator (with its ZOH) is made to resemble an amplitude balanced step function, i.e., a doublet—either positive or negative going—within any given sample period T. The step transition occurs at one-half of the period (i.e., at T/2).

In another embodiment, phase loss associated with the differentiator is further reduced by a concept referred to as "early-off holding". In early-off holding, the output waveform of the digital differentiator is shortened such that the total time that the waveform is applied is compressed within some fraction of the total sampling period. During the remaining portion of the sampling period the digital differentiator (again, with its associated ZOH) "shuts off" or changes the output of the hold device to some desired reference level.

In yet another embodiment, the natural "notch" filter associated with the previous embodiments described above is utilized to improve overall loop stability. This still further decreases the aforementioned phase loss as a function of the active portion of the differentiator output.

BRIEF DESCRIPTION OF THE DRAWINGS

The novel features believed characteristic of the invention are set forth in the appended claims. The invention itself however, as well as other features and advantages thereof, will be best understood by reference to the description which follows, read in conjunction with the accompanying drawings, wherein:

FIGS. 6A & 6B show a Bode plot of analog and digital differentiators as a function of frequency.

FIG. 7A & 7B show a Bode plot comparing the conventional differentiator (with associated zero-order hold) versus the digital differentiator (with associated zero-order hold) employed within the presently invented control system.

DESCRIPTION OF THE PREFERRED EMBODIMENT(S)

An automatic control system with reduced phase loss is described. In the following description, numerous specific details are set forth such as time periods, equations, diagrams, etc., in order to provide a thorough understanding of the invention. It will be obvious, however, to one skilled in the art that these specific details need not be used to practice the present invention. In other instances, well-known structures and methods have not been set forth in detail in order to avoid unnecessarily obscuring the present invention.

In the course of describing the present invention, reference is sometimes made to use of the invention in conjunction with specific applications, such as a disk controller for use in a magnetic recording system. It is appreciated that such implementations merely reflect a particular embodiment and it should not be taken as a limitation on the scope of the present invention. Hence, it should be understood that the concepts presented in this specification may be employed in a wide range of control system applications. This means that the novel aspects described below are essentially fundamental in nature—finding wide application within the more general field of sampled-data and digital control systems.

Figure 1:
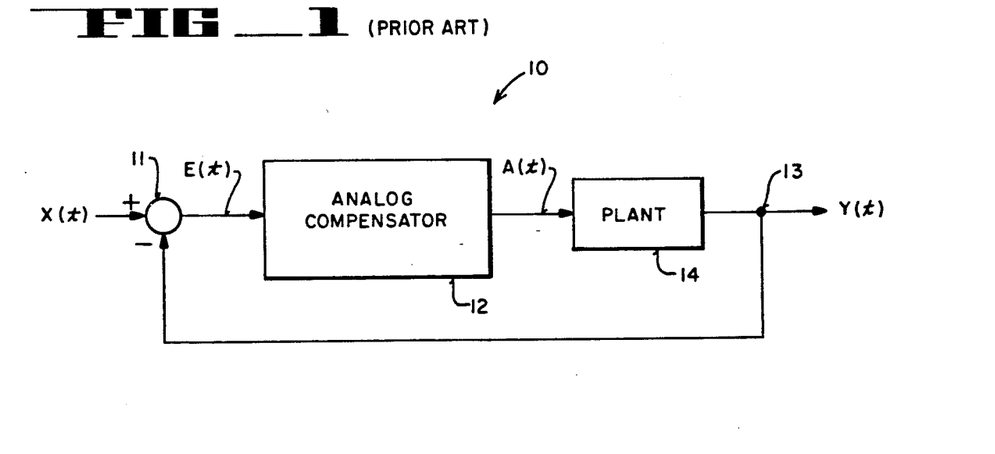
FIG. 1 is a block diagram of a prior art continuous closed-loop control system.

FIG. 1 is a block diagram of a typical continuous closed loop control system 10. Plant 14 is the physical system or process to be controlled. In one embodiment, for example, plant 14 might comprise a magnetic recording system in which the position of the transducer over the magnetic recording media is controlled by a servo mechanism which receives signals from the read/write electronics of the system. In FIG. 1, the output signal, or controlled variable, Y(t), is shown being compared to a reference input, X(t). By analog to the disk controller system above, the reference input may be represented by an electrical signal corresponding to a particular track to be read from the media surface. The controlled signal would then be given by the response of the servo track which indicates the present position of the transducer relative to each track.

The comparison between the reference input and the controlled signals occurs at sensing device 11. Device 11 acts as a function point for signal comparisons. Physically, sensing device 11 comprises an ordinary differential amplifier, multiplier, some other signal-processing transducer or similar circuitry. In the case of FIG. 1, the output of device 11 is an error signal, E(t), which corresponds to the difference between the input reference, X(t), and the output, Y(t). This error signal is provided as an input to analog compensator 12.

Compensator 12 is a dynamic system purposefully added to the loop to enhance the closed-loop system characteristics. The output of compensator 12 is an actuating signal, A(t), which is made a function of the error signal, E(t). The actuating signal is developed for correction of plant 14. It is the compensator block which contains the control strategy for the entire control system.

Figure 2:
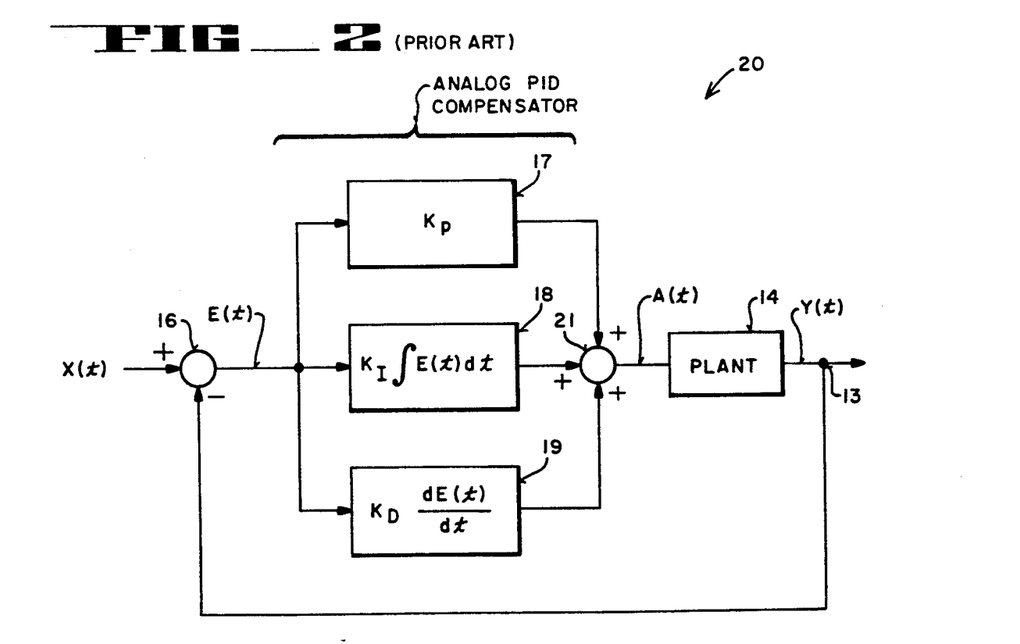
FIG. 2 illustrates a prior art continuous closed-loop control system incorporating a PID compensator as part of its control strategy.

FIG. 2 illustrates a feedback control system 20 utilizing a proportional-plus-integral-plus-derivative (PID) compensator as part of its control strategy. Block 17 embodies the proportional control, block 18 the integral control, and block 19 the derivative control element. Each of these blocks receives the error signal, E(t), and produces an output which is summed by summing device 21 to deliver the actuating signal to plant 14.

A P-controller provides pure gain (no dynamics) having a value $K_P$. In other words, proportional control is when the actuating signal is made to be made linearly proportional to the error. Derivative or integral control involves making the actuating signal proportional to the derivative, or the integral, of the error signal, respectively. It is appreciated that PID controllers of the type shown in FIG. 2 are commonly employed in control systems in which improvements in both the transient response and steady-state response are required.

Alternatively, the PID compensator of FIG. 2 could be implemented digitally. One way that this can be accomplished is to first define the control strategy in the continuous or s-domain (i.e., the Laplace domain), and then convert that strategy to a digital algorithm using any number of well-known techniques.

Figure 3A:
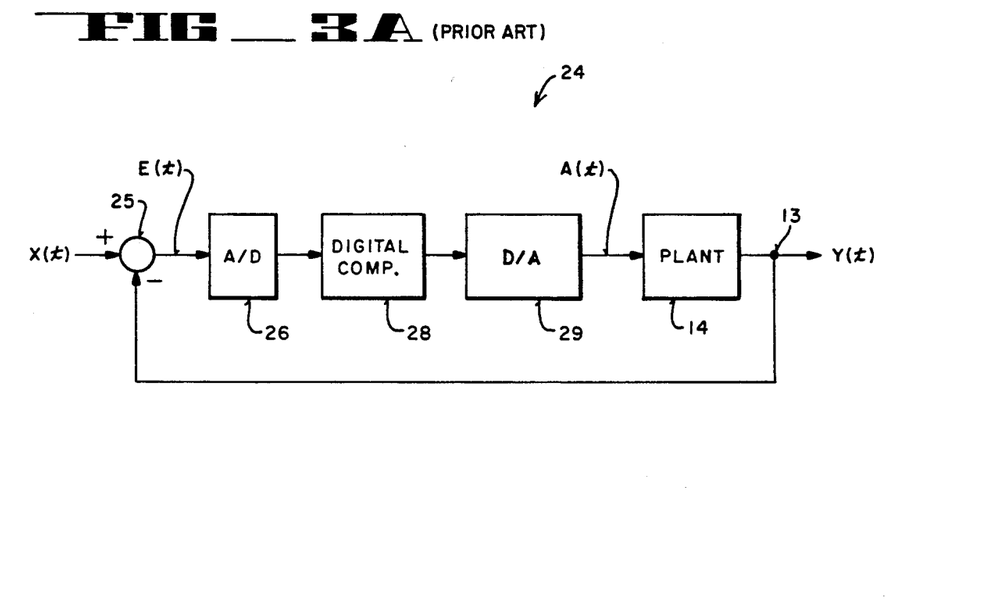
FIG. 3A is a block diagram of a sampled-data control system employing an analog-to-digital converter as a sampling device and a digital-to-analog converter as a hold device.
Figure 3B:
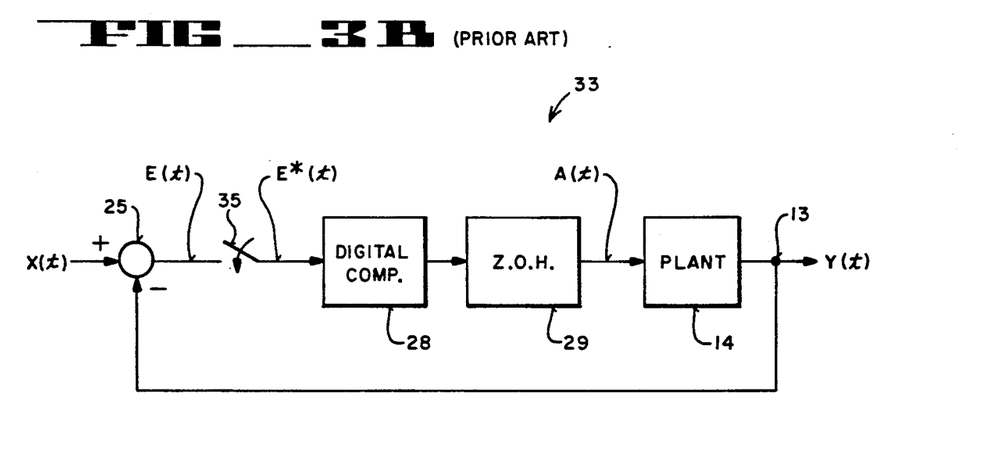
FIG. 3B is a block diagram of the sampled-data control system of FIG. 3A in which the function of the analog-to-digital converter has been replaced by an ideal sampler. The digital-to-analog converter has been replaced by an ideal hold.

FIGS. 3A and 3B illustrate two digital sampled-data control loops. One of the features common to both of these two digital control systems is that the inputs to both digital compensators 28 are in the form of pulse trains. In other respects, the dynamics of the systems are identical to those which operate upon analog signals. Considering the example of a disk drive recording system, this means that the position of the magnetic transducers may be controlled either by an analog or a digital controller.

In the case of a digital controller, interface circuitry such as a digital-to-analog (D/A) converter is necessary to couple the digital signals to the analog devices. In the block diagrams of FIGS. 3A and 3B, the operations of a D/A are modeled analytically by a zero-order hold 29. To convert the analog error signal, E(t), back into a digital signal for input to compensator 28, an analog-to-digital (A/D) converter 26 is needed. In the digital control system of FIG. 3B, the operation of A/D 26 is modeled by an ideal sampler having a sampling period T. The sampling in this case is simply represented by switch 35.

Figure 4A:
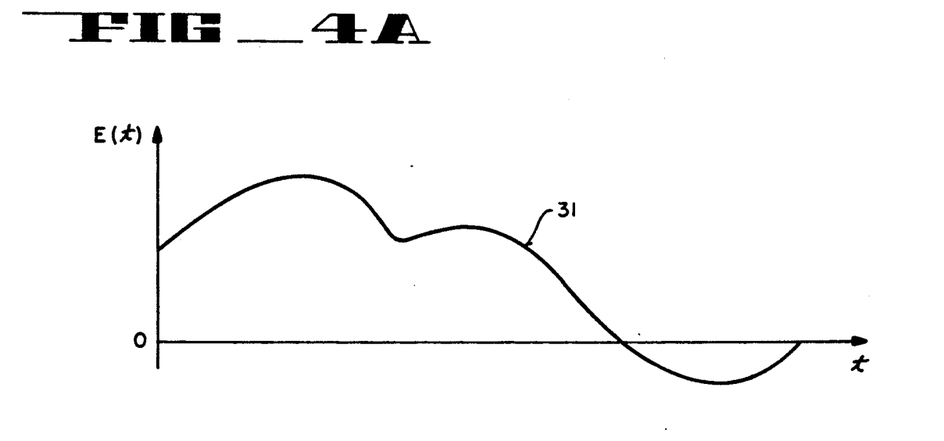
FIG. 4A is an example of a error signal which may be applied to the control system of the present invention.
Figure 4B:
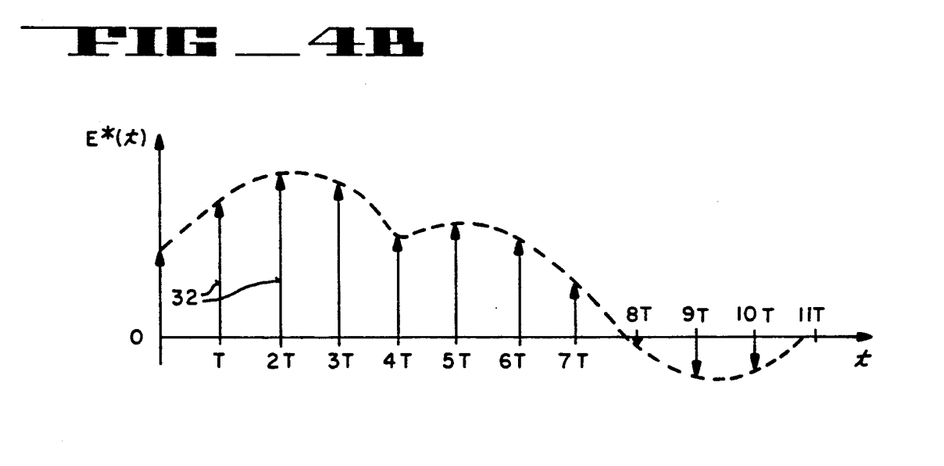
FIG. 4B illustrates the output impulses produced by an ideal sampler in response to the error signal of FIG. 4A.
Figure 4C:
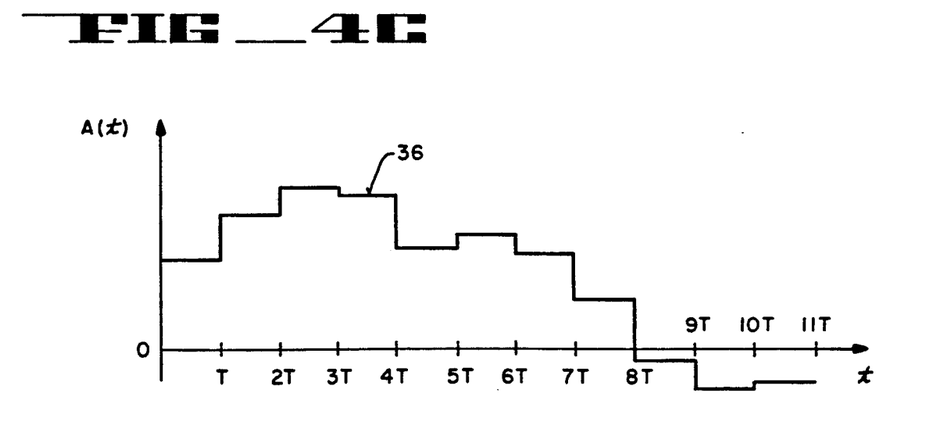
FIG. 4C illustrates the output signal produced by a zero-order hold in response to the impulse train of FIG. 4B.

With reference now to FIG. 4A–4C, when an analog signal 31 is applied to an ideal sampler, the output of the sampler is a train of impulses, each occurring at an integral multiple of the sampling period. This output is shown in FIG. 4B, wherein the impulses are represented by arrows 32. These impulses are received by the digital compensator 28 which in turn generates a digital output coupled to zero-order hold 29.

Referring once again to FIGS. 3A & 3B, zero-order hold (ZOH) 29 acts as a filter which converts the digital output of compensator 28 into an analog actuating signal, A(t). Functionally, ZOH 29 may be thought of as holding the magnitude of the impulses generated by compensator 28 at a given time instant, kT. ZOH 29 holds the output of compensator 28 for the entire sampling period T, until the next pulse arrives at t=(k+1)T. Thus, the output of ZOH 29 is a staircase function which approximates the error signal, E(t), operated on by compensator 28. FIG. 4C illustrates the output waveform 36 generated by ZOH 29 in response to error signal 31.

Figure 5:
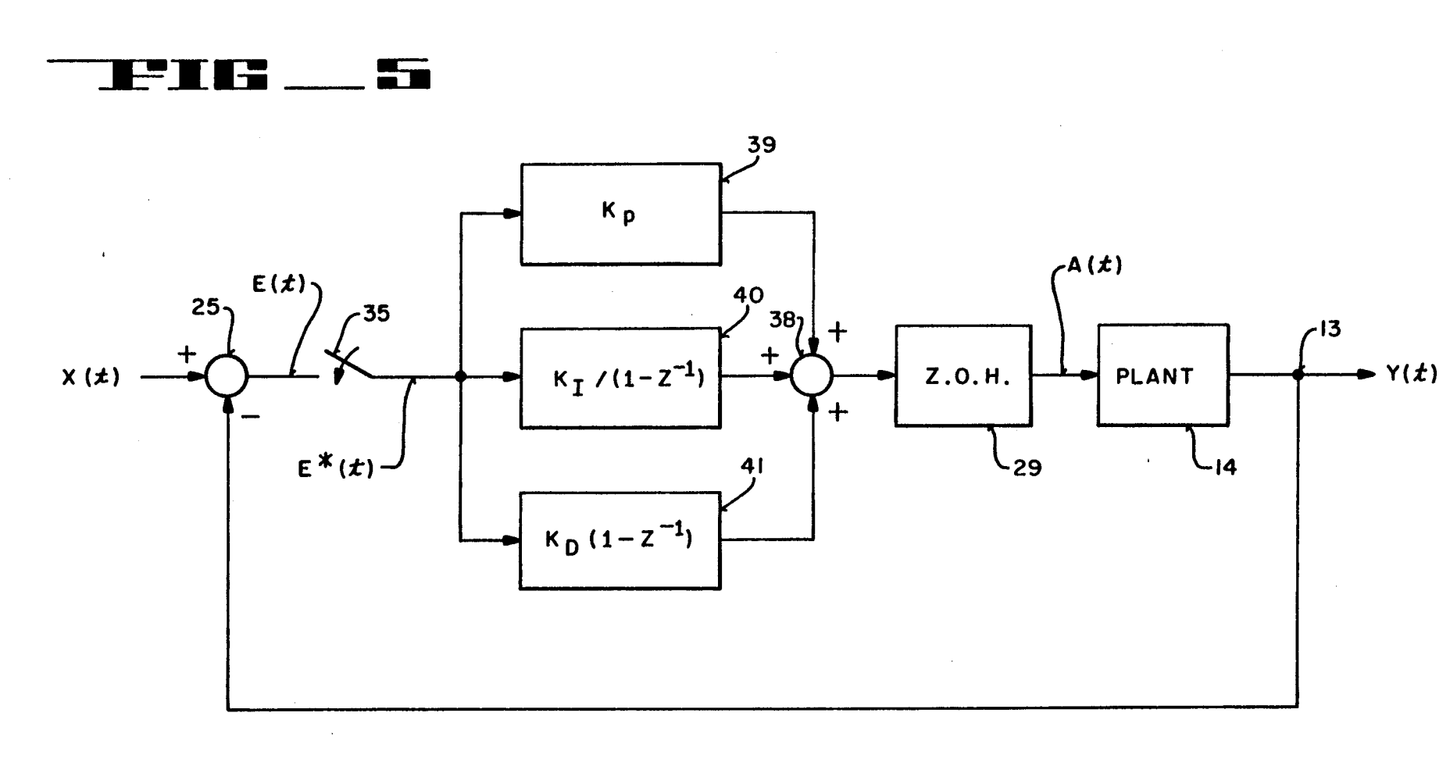
FIG. 5 illustrates a sampled-data control system which includes a digital PID compensator.

FIG. 5 illustrates the control system of the present invention which utilizes a digital PID compensator. The digital compensator comprises proportional block 39, integral block 40, and derivative block 41. Each of blocks 39 through 41 can be realized mathematically by equations (1)–(3), respectively, as follows:

$$A(n) = Kp * E(n) \rightarrow D_p(z) = Kp \quad (1)$$

$$A(n) = A(n-1) + Ki * E(n) \rightarrow D_i(z) = Ki/(1 - z^{-1}) \quad (2)$$

$$A(n) = Kd[E(n) - E(n-1)] \rightarrow D_d(z) = K_d * (1 - z^{-1}) \quad (3)$$

Each of the terms $D_p$, $D_i$, and $D_d$, each refer to the respective transfer function region blocks 39 through 41 (proportional, integral and derivative) written using the z-transform. The z-transform is a mathematical tool for converting functions in the Laplace domain (s-domain) into algebraic ones in z. The definition of the z-transform is:

$$z = e^{Ts} \quad (4)$$

where s is the Laplace transform variable and T is the sampling period. According to FIG. 5, the outputs of each of the respective PID controller blocks are summed by device 38 and then transformed into an analog signal by zero-order hold 29.

Figure 6A:
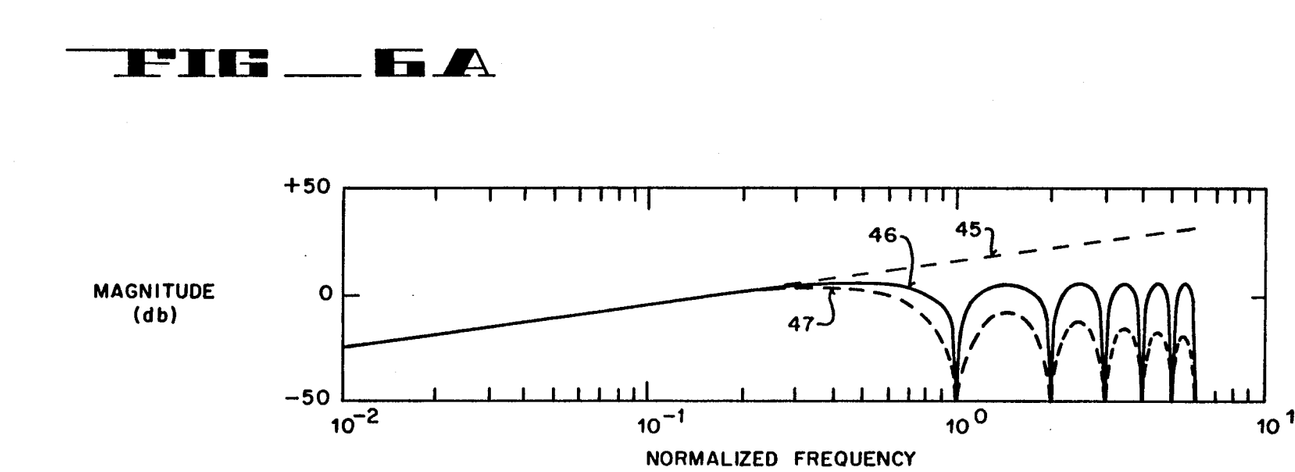
FIG. 6A illustrates the magnitude response for the two systems.
Figure 6B:
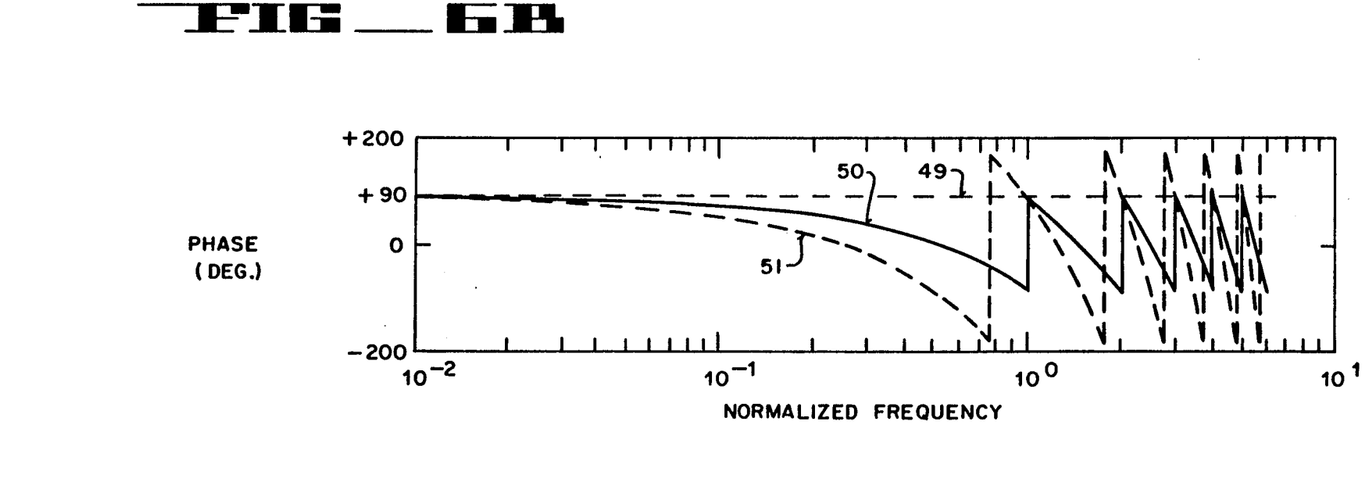
FIG. 6B illustrates the phase response.

FIGS. 6A and 6B illustrate how the digital differentiator of FIG. 5 differs in its overall frequency characteristics from an analog differentiator. FIGS. 6A & 6B are a Bode plot that illustrates the difference in magnitude and phase response versus normalized frequency. In FIG. 6A, line 45 represents the response of an analog differentiator, while line 46 is the response characteristic produced by the digital differentiator of equation 3. Waveform 47 is the output of the digital differentiator, with its associated zero-order hold 29, for the digital control system of FIG. 5.

The phase responses of the analog, digital and digital-plus-ZOH systems are illustrated by lines 49 through 51, respectively, in FIG. 6B. Note that the loss of phase suffered by the digital differentiator (i.e., line 50) in comparison to the analog differentiator, represented by line 49. Response waveform 51 further illustrates the extensive phase loss suffered when cascading the ZOH to the differentiator algorithm. It is appreciated by practitioners in the art that the digital algorithms represented by equations (1)–(3) are preferably implemented using a digital computer, such as a microprocessor, functioning as a controller.

As previously discussed, the present invention involves implementing a digital differentiator in a way that reduces its phase loss as compared with conventional digital differentiators. The traditional differentiator represented by equation (3), with its associated ZOH, can be re-written to express its output for all time in the following way:

$$A(t) = \quad (5)$$

$$\sum_{n=0}^{\infty} K_d[E(nT) - E((n-1)T)][(t - nT) - (t - (n+1)T)]$$

In the s-domain the transfer function corresponding to equation (4) is given as:

$$\frac{A(s)}{E^*(s)} = Kd(1 - e^{-sT}) \left( \frac{1 - e^{-sT}}{s} \right) \quad (6)$$

Those familiar with control systems theory will appreciate that the digital differentiator represented by equations (5) and (6) subtracts the past error sample from the present one. Conversely, the digital differentiator employed within the control system of the present invention is based only on the present error sample. Equations (7) and (8) below represent the algorithm for implementing the digital differentiator of the present invention with its associated ZOH. This differentiator can be implemented using the general circuit of FIG. 5 to provide a response having less phase loss over the sample period.

$$A(t) = \qquad (7)$$

$$\sum_{n=0}^{\infty} K_d[E(nT)[(t - nT) - 2(t - (n + 1/2)T) + (t - (n + 1)T)]]$$

$$\frac{A(s)}{E^*(s)} = K_d \left( \frac{1 - 2e^{-0.5sT} + e^{-sT}}{s} \right) \qquad (8)$$

Figure 7A:
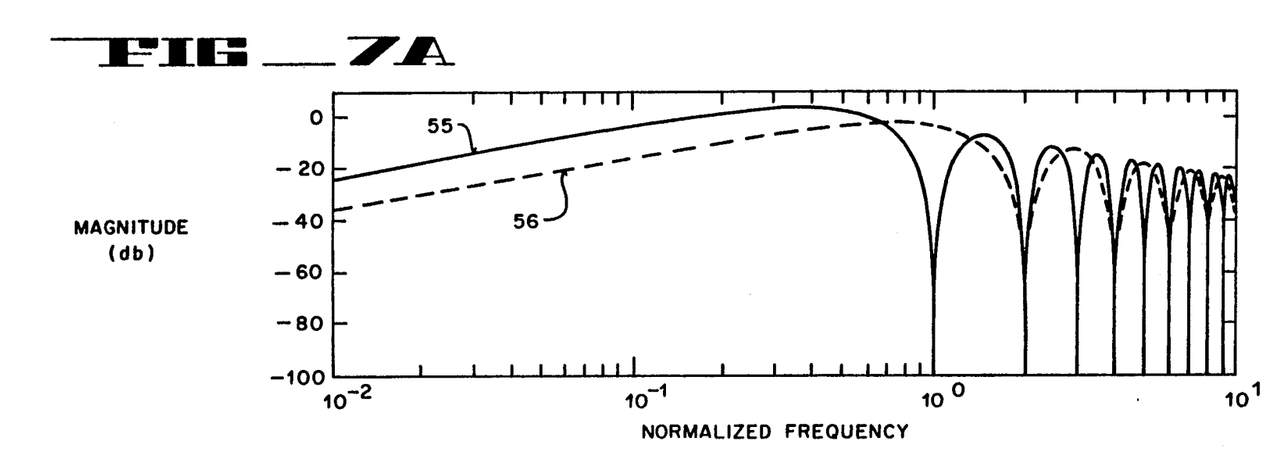
FIG. 7A illustrates the magnitude response and FIG. 7B illustrates the phase response.
Figure 7B:
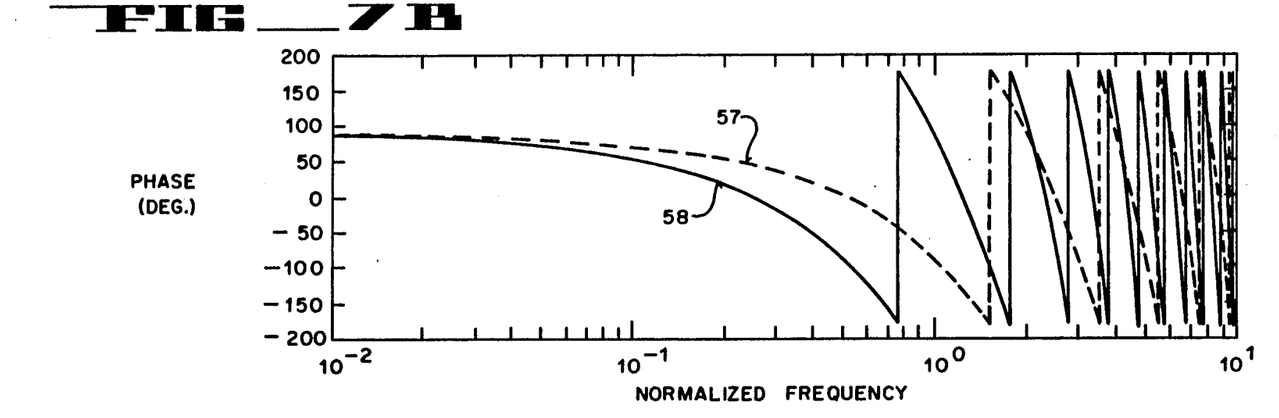

The Bode plot of FIGS. 7A and 7B shows how the present invention reduces phase loss as a function of frequency as compared against conventional approaches. In FIG. 7A, waveform 55 represents the magnitude response associated with the prior art digital differentiator embodied in equations (5) and (6), while waveform 56 represents the magnitude response of the present invention, as embodied in equations (7) and (8). Note that the slight loss in magnitude observed in the response curve of the present invention may be easily overcome by increasing the gain in some other portion of the system. By way of example, the overall loop gain can be raised by increasing the individual gain of ZOH 29 (see FIG. 5), arithmetic sensor device 25, or plant 14.

The important thing to note is that the phase loss experienced by the control system of the present invention—denoted by waveform 57 in FIG. 7B—is appreciably less than that produced by the traditional differentiator of waveform 58. It can be clearly seen that the phase loss of the differentiator described by equations (7) and (8) is approximately one-half that of the prior art differentiator of equations (5) and (6).

Figure 8A:
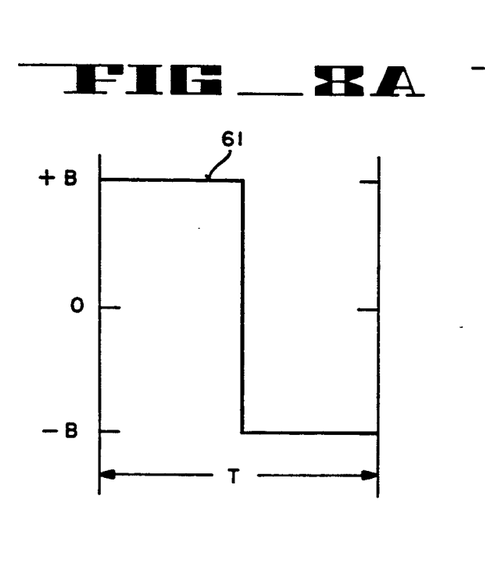
FIGS. 8A & 8B illustrate exemplary output waveforms generated over a single sampling period by the digital differentiator utilized within the control system of the present invention.
Figure 8B:
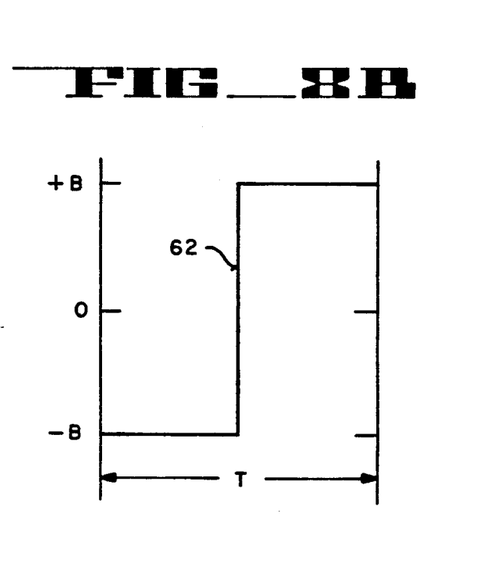

FIGS. 8A and 8B illustrate exemplary output waveforms generated over single sampling period by the differentiator embodied in equation 8. During each sample time period, the differentiator outputs two levels of command—both levels being equal in magnitude and opposite in sign. The shape of the waveform itself resembles either a negative-going or positive-going step function. This type of waveform is commonly referred to as a "doublet". The order or direction of the doublet is dependent on the sign of the error for any given sample. For example, FIG. 8A shows waveform 61 representing the output of a positive error having magnitude +B. On the other hand, FIG. 8B shows an output waveform 62 with a negative error of magnitude −B.

Figure 9:
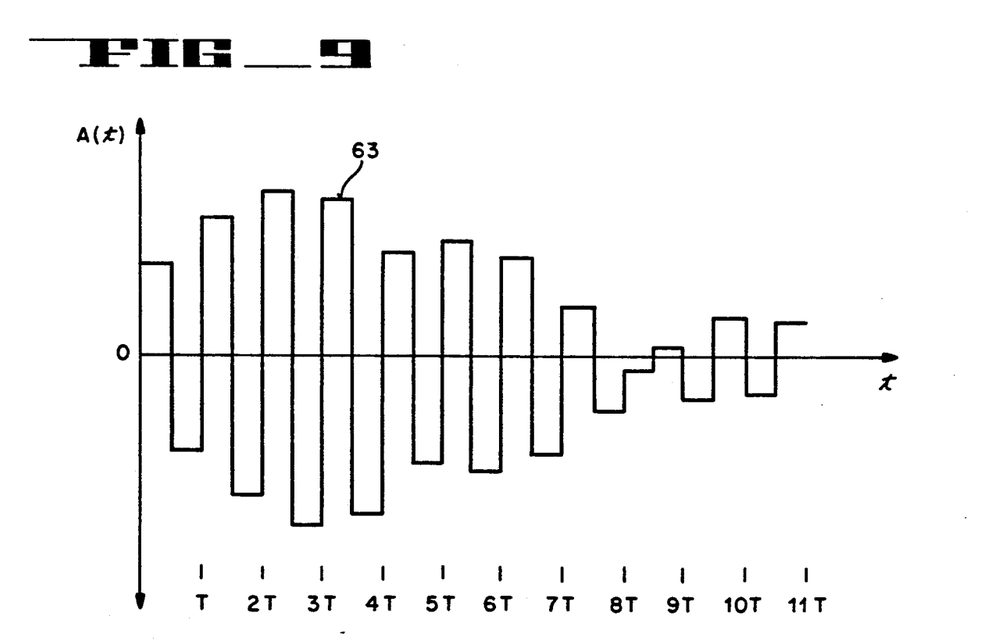
FIG. 9 is a plot of the output signal of the digital differentiator and zero-order hold utilized in the present invention in response to the sampled input signal shown in FIG. 4A.

By way of example, FIG. 9 is a plot of the output signal of the digital differentiator and zero-order hold implementing equation (8) for the control system of FIG. 5. Within FIG. 9, waveform 63 represents the response of the invented control system to the sampled input signal provided in FIG. 4A.

Figure 10A:
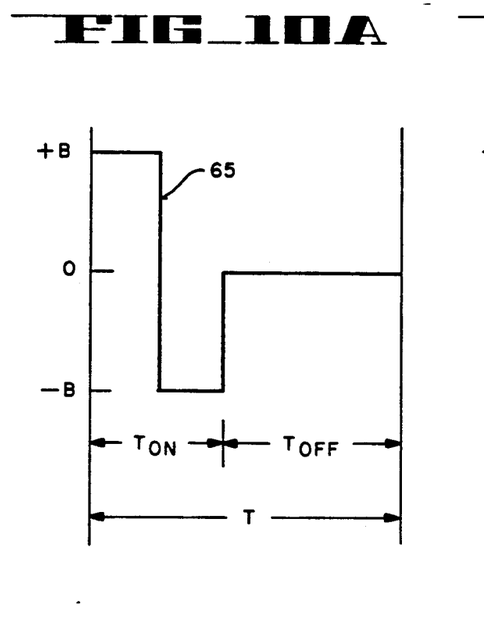
FIGS. 10A & 10B illustrate shortened output waveforms over a single sample period as produced by an alternative embodiment of the digital differentiator utilized in the control system of the present invention. The waveforms show the "early-off hold" concept.
Figure 10B:
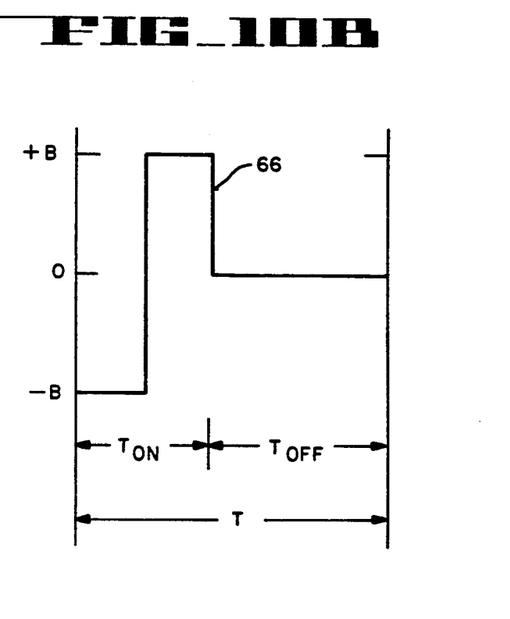

The reduced phase loss associated with the differentiator described in equation (8) may be even further reduced by the additional invented concept known as "early-off holding". In general, early-off holding involves implementing the hold function in a digital control system in such a was as to reduce the amount of delay or phase lag introduced into the system by this hold function. Instead of holding the instantaneous output of the differentiator as a constant value with the duration of a sample period, early-off holding simply holds the instantaneous output value as a constant for some fraction of the sample period. During the remaining portion of the sampling period, the output is simply shut off or changed to an appropriate reference level. In other words, the phase characteristics of the control system may be further improved by shortening the time that the output waveform of the digital differentiator is applied; that is, shortening the "on" time, $T_{on}$. FIGS. 10A and 10B illustrate this further inventive concept.

In FIGS. 10A and 10B, output waveforms 65 and 66 correspond to waveforms 61 and 62 of FIGS. 8A and 8B, but with early-off sampling included. By way of example, in FIG. 10A the output of the digital differentiator is shown to be active during the time period $T_{on}$, which is a fractional portion of sampling period T. During this active portion of the sampling period, the output waveform resembles a doublet having a 50% duty cycle. In case of waveform 65, a positive error signal of magnitude +B is shown. During the inactive portion of the sampling period, output waveform 65 is forced to zero or some other desired reference level. This is shown occurring at the time period $T_{off} = T - T_{on}$. Similarly, output waveform 66 shown in FIG. 10B depicts early-off sampling with a negative error signal of magnitude −B. Equations 9 and 10 below describe the digital differentiator (with its associated ZOH) whose output is illustrated in FIGS. 10A and 10B.

$$A(t) = \sum_{n=0}^{\infty} K_d[E(nT)[(t - nT) - \qquad (9)$$

$$2(t - (nT + T_{ON}/2)) + (t - (nT + T_{ON}))]$$

$$\frac{A(s)}{E^*(s)} = \frac{1 - 2e^{-sT_{on}/2} + e^{-sT_{on}}}{s} \qquad (10)$$

Figure 11:
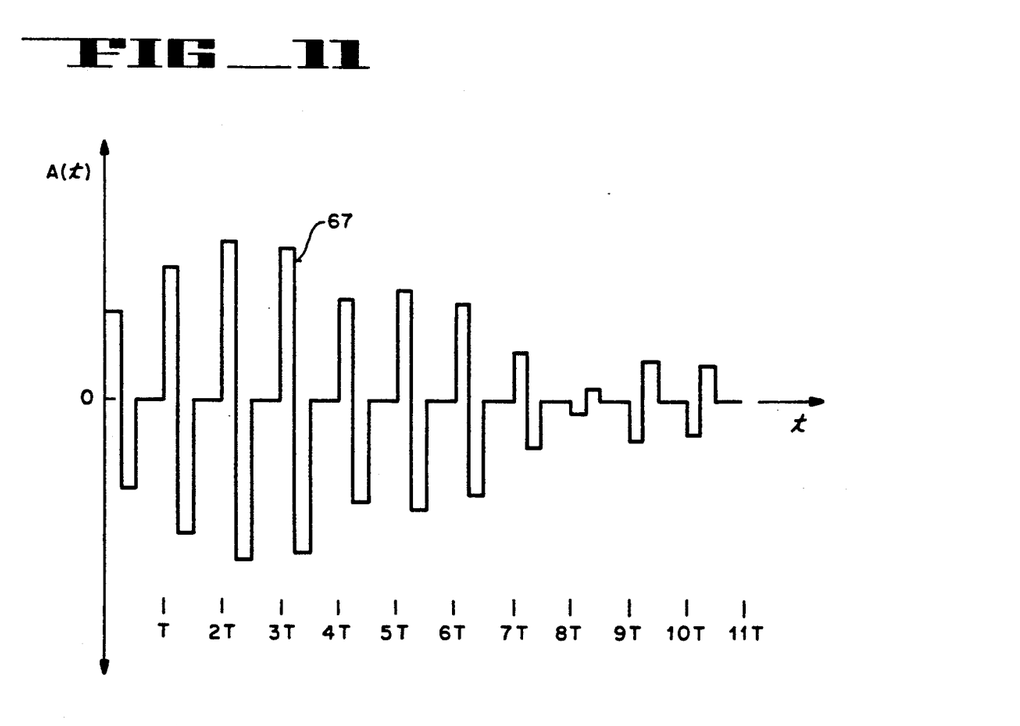
FIG. 11 is a plot of the output signal of the digital differentiator and zero-order hold utilized in the present invention in response to the sampled input signal of FIG. 4A. The plot of FIG. 11 is in accordance with the "early-off hold" concept.

FIG. 11 illustrates the response of the digital differentiator and zero order hold described by equations (9) and (10) to the sampled input signal of FIG. 4A. Although it should be appreciated that $T_{on}$ is a variable having a great number of possible values, waveform 67 of FIG. 11 is shown by way of example as having $T_{on} = 0.5^*T$.

Figure 12A:
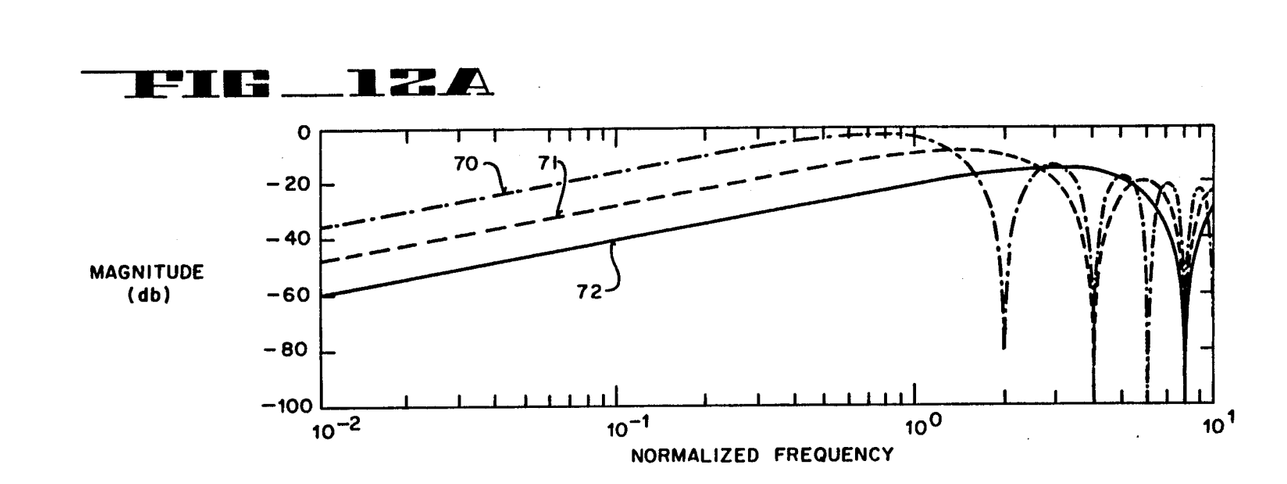
FIGS. 12A & 12B show a Bode plot of the digital differentiator and zero-order hold utilized to generate the output of FIG. 11 for various $T_{on}$ values.
Figure 12B:
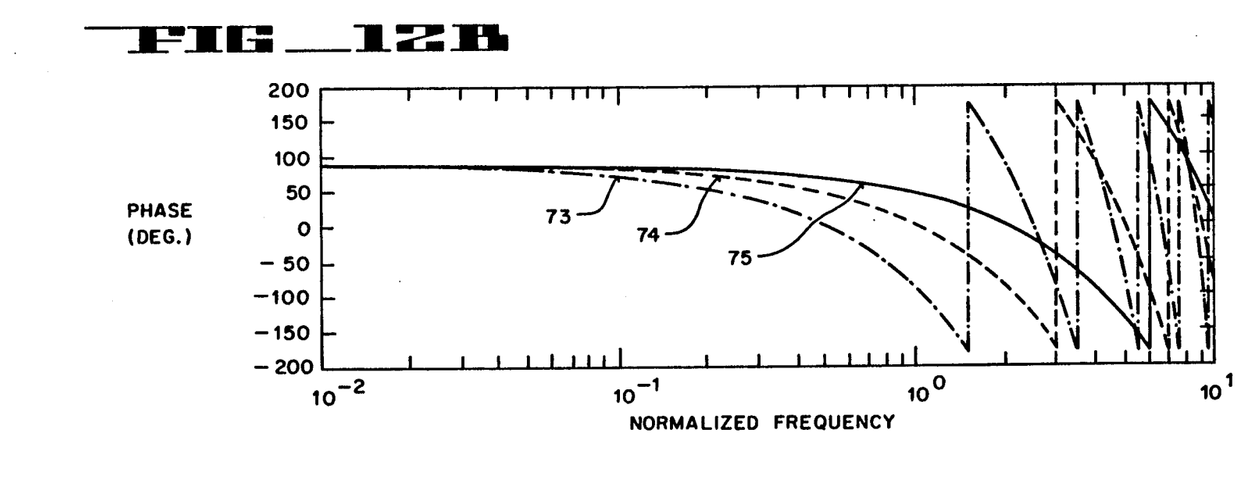

FIGS. 12A and 12B is a Bode plot which illustrates the improved phase characteristics of the digital differentiator and zero-order hold used to generate the output of FIG. 11 for various $T_{on}$ values. For instance, waveforms 75 and 72 represent plots for $T_{on} = 0.25^*T$; waveforms 74 and 71 represent plots of the differentiator for $T_{on} = 0.5^*T$; and waveforms 73 and 70 represent plots of the differentiator described in equation (10) for $T_{on} = T$. (Note that when $T_{on} = T$, equation (10) becomes the same as equation (8)).

As can be seen, the phase characteristics of FIGS. 12A and 12B show considerable improvement as $T_{on}$ becomes shorter. At the same time, the shorter $T_{on}$ is, the greater the loss in magnitude response experienced by the differentiator. In other words, the magnitude response for equation (10) is proportional to the time that the actuating signal is applied (i.e., $T_{on}/T$). To compensate for this magnitude loss, the gain of some other element of the loop may be raised by a factor $T/T_{on}$. Raising the gain of some element of the loop increases the overall loop gain, thereby raising the magnitude response of the control system without any corresponding degradation in phase.

In yet another embodiment, the algorithm for implementing the digital differentiator given by equation (8) may be further adjusted for added improvement in loop stability. To appreciate this aspect of the invention, one must understand that the plant to be controlled typically has associated with it certain resonances. For instance, in the case of a magnetic recording system, mechanical resonances are produced by movement of the transducers across the magnetic media by means of the actuator assembly. The frequency at which these resonances occur may only be remotely related to the frequency range of interest, but in a sampled control loop system, the sampling phenomenon can cause a resonance to appear at other frequencies. This property of sampled systems is commonly known as aliasing.

The aliasing phenomenon is always present in a sample system. It can be particularly troublesome when undesirable characteristics of the plant at one frequency show up at multiple frequencies. One prior art approach to minimizing this problem has been to reduce the magnitude of the resonances by means of a filter. However, adding an electronic filter to the basic control system adds cost as well as an additional element in the control loop. As is appreciated by practitioners in the field, adding elements to the control loop can potentially reduce loop stability.

In an alternative to the filter approach an additional embodiment of the present invention notices the natural "notch" filter associated with the digital differentiator and zero-order hold described by equation (8). As discussed above, FIGS. 12A and 12B illustrate how phase loss may be decreased as a function of $T_{on}$. It is also evident in these figures that a null exists in the frequency response-that null also being a function of $T_{on}$. This null is used in the present invention as a notch filter capable of reducing the magnitude of a specific plant resonance. The result minimizes the aliasing phenomenon.

Of course, for the null to be effective it must be placed where the resonance occurs. With respect to the differentiator represented by equation (10), the lowest frequency that one can place the "notch" is at approximately twice the sample rate. Unfortunately, there may be instances when the plant resonance is below this frequency. In such a situation, equation (11), provided below, describes a differentiator that allows the "notch" to be moved under twice the sample rate.

$$A(t) = \sum_{n=0}^{\infty} E(nT) [(t - (nT + T_{off1})) - \qquad (11)$$

$$(t - (nT + T_{off1} + T_{on})) - (t - (nT + T/2 + T_{off2})) +$$

$$(t - (nT + T/2 + T_{off2} + T_{on}))]$$

Equation (11) may be re-written in the s-domain as the transfer function of the digital differentiator (with its associated zero-order hold) as:

$$\frac{A(s)}{E^*(s)} = \qquad (12)$$

$$\frac{e^{(-T_{off1})s} - e^{-(T_{off1}+T_{on})s} - e^{-(T/2+T_{off2})s} + e^{-(T/2+T_{off2}+T_{on})s}}{s}$$

Figure 13:
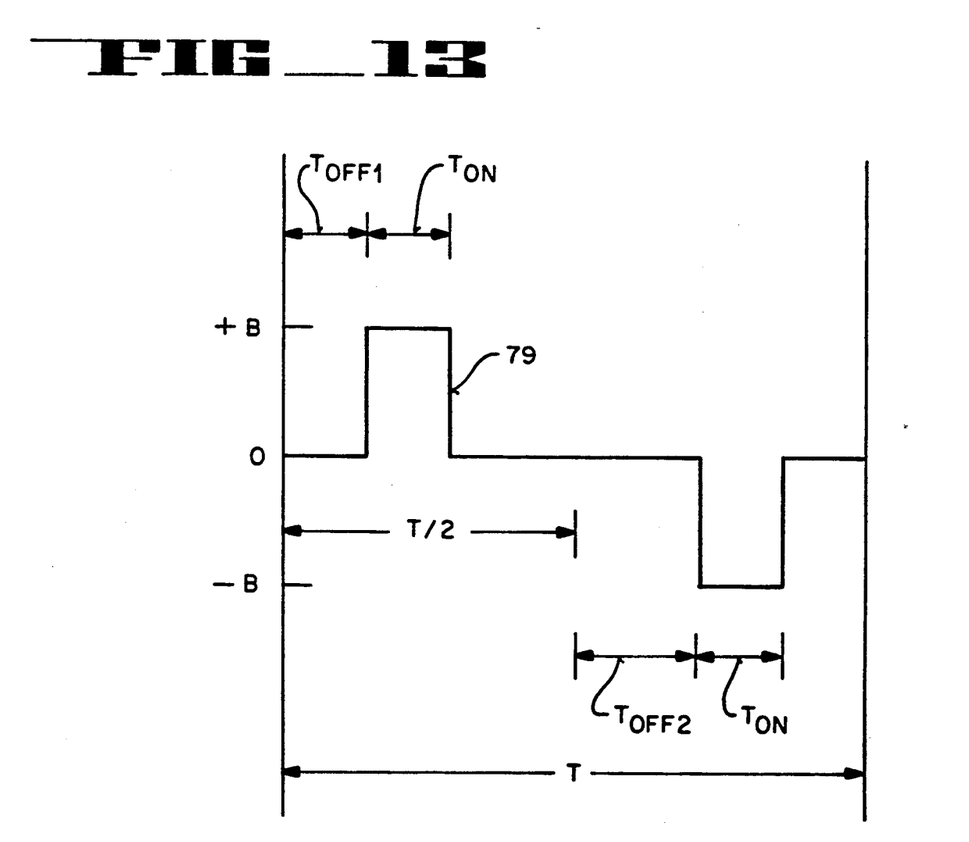
FIG. 13 illustrates a sample output waveform produced by the digital differentiator and zero-order hold employed in yet another embodiment of the present invention.

The nature of variables $T_{off1}$, $T_{off2}$ in equations (11) and (12), and their relationship to the variables $T_{on}$ and the sampling period T, are best understood by considering the example output waveform of FIG. 13. FIG. 13 illustrates an output waveform produced by the digital differentiator and zero-order hold described by equation (12).

A positive error sample produces a doublet having magnitude +B during the first half of the sampling period, whereas the second half of the sampling period comprises a doublet of opposite magnitude. The duration of both pulses in FIG. 13 is the same, i.e., $T_{on}$. The relative location in time of the individual step function pulses of waveform 79 is determined by the variables $T_{off1}$ and $T_{off2}$. It is appreciated that the duration of each half of the differentiator output, as well as the placement of the pulses within the sampled time period, can vary by adjustment of the variables $T_{off1}$, $T_{off2}$ and $T_{on}$. The influence that each of these differentiator parameters has on the final output result is illustrated by the Bode plot of FIG. 14A and 14B. Table 1 summarizes the parametric values which were used to generate the waveforms illustrated in these two figures.

TABLE I

Figure 14A:
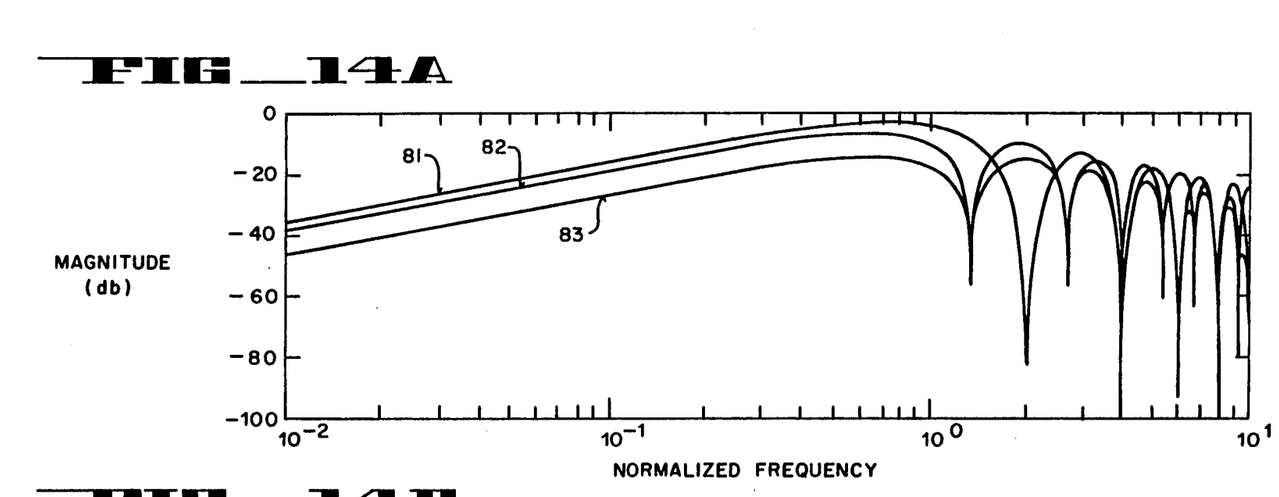
FIGS. 14A & 14B show Bode plots of the digital differentiator and zero-order hold which produced the waveform of FIG. 13. Each of the output waveforms of FIGS. 14A and 14B was generated using various values of $T_{off1}$, $T_{off2}$, and $T_{on}$.
Figure 14B:
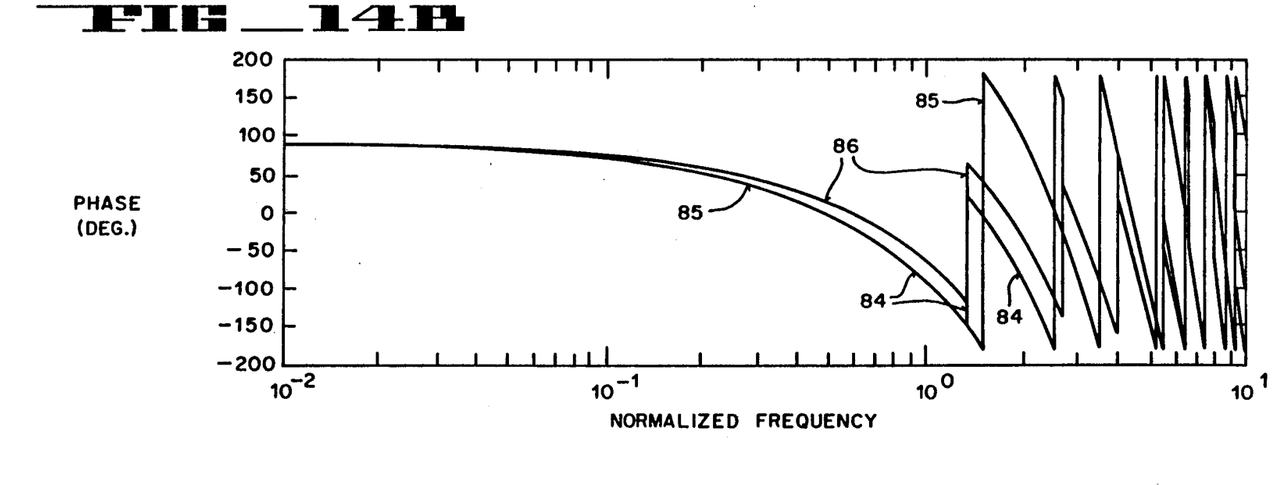

| Waveform | $T_{on}$ | $T_{off1}$ | $T_{off2}$ |
|---|---|---|---|
| 81 | T/2 | 0.0*T | 0.0*T |
| 82 | 0.25*T | 0.0*T | 0.25*T |
| 83 | 0.1*T | 0.0*T | 0.25*T |
| 84 | T/2 | 0.0*T | 0.0*T |
| 85 | 0.25*T | 0.0*T | 0.25*T |
| 86 | 0.1*T | 0.0*T | 0.25*T |

The phase loss of the differentiator described in equation 12 may be further improved, and the notched position maintained, by keeping the position of each half of the differentiator command the same within the sample period and by shortening their duration (i.e., $T_{on}$). This is shown in FIGS. 14A and 14B by waveforms 83 and 86.

Once again, for the differentiator of equation (12) the magnitude response is proportional to the time that the actuating signal is applied. Therefore, when using this technique, the resulting loss in magnitude must be compensated for by some other element in the control loop. As has been previously discussed, this is easily achieved by increasing the gain of some element within the control loop by a factor $T_{on}/T$.

We claim:

1. A digital control system for controlling an output signal of a plant comprising:
difference sensing means for generating an error signal representative of the difference between a reference input and said output signal;
sampling means for sampling said error signal;
digital compensator means including proportional, derivative, and integral control elements for developing an actuating signal proportional to said error signal, said actuating signal being applied to said plant for correction of said output signal, said derivative control element producing an output waveform and comprising a digital differentiator coupled to an associated zero-order hold, wherein said derivative control element implements an algorithm based only on the present error sample of said error signal such that, within a given sampling period, said output waveform is characterized as a doublet.

2. The control system of claim 1 wherein the step transition of said doublet occurs at one-half of said sampling period.

3. The control system of claim 1 wherein said digital compensator means includes means for compressing said output waveform to fit within a predetermined fraction of said sampling period such that said output waveform is realized by said doublet during said predetermined fraction, and by a reference level during the remaining portion of said sampling period.

4. The control system of claim 1 wherein said plant comprises a magnetic recording system.

5. A sampled-data control system for controlling an output signal, Y(t), of a plant comprising:
- difference sensing means for generating an error signal, E(t), representing the difference between a reference input, X(t), and said output signal;
- sampling means for sampling said error signal to produce a sampled error signal, E*(t);
- a digital compensator including a digital differentiator with an associated zero-order hold for developing an actuating signal, A(t), which is a function of said error signal, said actuating signal being applied to said plant for correction of said output signal,
- the transfer function of said digital differentiator with said associated zero-order hold being represented in the s-domain by the equation:

$$\frac{A(s)}{E^*(s)} = K_d \left( \frac{1 - 2e^{-0.5sT} + e^{-sT}}{s} \right)$$

where
$K_d$ is a constant and T is the sampling period.

6. The control system of claim 3 wherein said zero-order hold comprises a means for holding the output of said digital differentiator as a constant value for a predetermined fraction of said sampling period, said zero-order hold producing a reference output level during the remaining portion of said sampling period.

7. The control system of claim 6 wherein the transfer function of said digital differentiator with said zero-order hold is represented in the s-domain by the equation:

$$\frac{A(s)}{E^*(s)} = \frac{1 - 2e^{-sT_{on}/2} + e^{-sT_{on}}}{s}$$

wherein
$T_{on}$ corresponds to said predetermined fraction of said sampling period.

8. The control system of claim 7 wherein $T_{on}$ approximately equals 0.5.

9. The control system of claim 7 further comprising compensation means for raising the loop gain by factor $T/T_{on}$ to compensate for gain loss attributable to said holding means.

10. The control system of claim 9 further comprising a means for reducing aliasing errors, said aliasing reduction means being incorporated into said differentiator and said zero-order hold such that said transfer function is given in the s-domain by the equation:

$$\frac{A(s)}{E^*(s)} = [e^{(-T_{off1})s} - e^{-(T_{off1}+T_{on})s} - e^{-(T/2+T_{off2})s} + e^{-(T/2+T_{off2}+T_{on})s}]/s$$

where $T_{off1}$ and $T_{off2}$ comprise first and second portions of said sampling period during which time said actuating signal is zero.

11. The control system of claim 5 wherein said plant comprises a magnetic recording system in which the position of a transducer is controlled by a servo mechanism.

12. In a sampled-data control system for controlling an output signal of a plant, said system implementing a control strategy which includes a digital differentiator and an associated zero-order hold, a method of reducing phase loss to raise the control bandwidth of said system comprising the steps of:
- generating an error signal, E(t), based on the difference between an input reference signal and said output signal of said plant;
- periodically sampling said error signal to produce a sampled error signal, E*(t);
- developing an actuating signal, A(t), which is a function of said sampled error signal, from said digital differentiator and said zero-order hold, the transfer function of said digital differentiator with said associated zero-order hold being given in the s-domain by the equation:

$$\frac{A(s)}{E^*(s)} = K_d \left( \frac{1 - 2e^{-0.5sT} + e^{-sT}}{s} \right)$$

where $K_d$ is a constant and T is the sampling period; and
applying said actuating signal to said plant for correction of said output signal.

13. The method of claim 12 wherein said plant comprises a magnetic recording system in which the position of a transducer is controlled by a servo mechanism.

14. In a sampled-data control system for controlling an output signal of a plant, said system implementing a control strategy which includes a digital differentiator and an associated zero-order hold, a method of reducing phase loss to raise the control bandwidth of said system comprising the steps of:
- generating an error signal, E(t), based on the difference between an input reference signal and said output signal of said plant;
- periodically sampling said error signal to produce a sampled error signal, E*(t);
- developing an actuating signal, A(t), proportional to said sampled error signal from said digital differentiator and said zero-order hold, the transfer function of said digital differentiator with said associated zero-order hold being given in the s-domain by the equation:

$$\frac{A(s)}{E^*(s)} = \frac{1 - 2e^{-sT_{on}/2} + e^{-sT_{on}}}{s}$$

wherein $T_{on}$ corresponds to the portion of the sampling period during which time said digital differentiator and associated zero-order hold are active; and
applying said actuating signal to said plant for correction of said output signal.

15. The method of claim 14 wherein $T_{on}$ equals 0.5T.

16. The method of claim 14 further comprising the step of increasing the overall loop gain of said system by a factor $T/T_{on}$.

17. The method of claim 14 wherein said plant comprises a magnetic recording system in which the position of a transducer is controlled by a servo mechanism.

18. In a sampled-data control system for controlling an output signal of a plant, said system implementing a control strategy which includes a digital differentiator and an associated zero-order hold, a method of reducing phase loss comprising the steps of:

generating an error signal, E(t), based on the difference between an input reference signal and said output signal of said plant;

periodically sampling said error signal to produce a sampled error signal, E*(t);

developing an actuating signal, A(t), proportional to said sampled error signal from an output waveform produced by said digital differentiator and said zero-order hold, the transfer function of said digital differentiator with said associated zero-order hold being given in the s-domain by the equation:

$$\frac{A(s)}{E^*(s)} =$$

$$[e^{(-T_{off1})s} - e^{-(T_{off1}+T_{on})s} - e^{-(T/2+T_{off2})} + e^{-(T/2+T_{off2}+T_{on})s}]/s$$

where $T_{on}$ corresponds to the portion of the sampling period, T, during which time said digital differentiator and associated zero-order hold are active, and wherein $T_{off1}$ and $T_{off2}$ comprise first and second inactive portions of said sampling period during which time said output waveform is zero; and applying said actuating signal to said plant for correction of said output signal.

19. The method of claim 18 further comprising the step of increasing the overall loop gain of said system by factor $T/T_{on}$.

20. The method of claim 18 wherein said plant comprises a magnetic recording system in which the position of a transducer is controlled by a servo mechanism.

* * * * *